United States Patent
Kakutani

(10) Patent No.: US 7,362,473 B2
(45) Date of Patent: Apr. 22, 2008

(54) IMAGE PROCESSING TECHNIQUE FOR TONE NUMBER CONVERSION OF IMAGE DATA

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 831 days.

(21) Appl. No.: 10/734,315

(22) Filed: Dec. 12, 2003

(65) Prior Publication Data

US 2004/0156077 A1 Aug. 12, 2004

(30) Foreign Application Priority Data

Dec. 13, 2002 (JP) .............. 2002-362216
Dec. 13, 2002 (JP) .............. 2002-362229

(51) Int. Cl.
*H04N 1/405* (2006.01)
(52) U.S. Cl. ............ 358/3.04; 358/3.03; 358/3.14
(58) Field of Classification Search .............. 358/1.9, 358/2.1, 3.03–3.05, 3.14–3.15; 382/251–252
See application file for complete search history.

(56) References Cited

U.S. PATENT DOCUMENTS

| | | | |
|---|---|---|---|
| 6,172,768 B1 * | 1/2001 | Yamada et al. ........... | 358/1.9 |
| 2004/0109204 A1 * | 6/2004 | Kato et al. ............. | 358/3.05 |
| 2006/0170973 A1 * | 8/2006 | Takahashi ............... | 358/3.03 |
| 2006/0290989 A1 * | 12/2006 | Kobayashi ............... | 358/3.03 |

FOREIGN PATENT DOCUMENTS

| JP | 07-226841 | 8/1995 |
|---|---|---|
| JP | 09-214759 | 8/1997 |
| JP | 11-261818 | 9/1999 |

OTHER PUBLICATIONS

Abstract of Japanese Patent Publication No. 09-214759, Pub. Date: Aug. 15, 1997, Patent Abstracts of Japan.
Abstract of Japanese Patent Publication No. 11-261818, Pub. Date: Sep. 24, 1999, Patent Abstracts of Japan.
Abstract of Japanese Patent Publication No. 07-226841, Patent Abstracts of Japan, Aug. 22, 1995.

* cited by examiner

*Primary Examiner*—Thomas D. Lee
*Assistant Examiner*—Stephen Brinich
(74) *Attorney, Agent, or Firm*—Martine Penilla & Gencarella, LLP

(57) ABSTRACT

The present invention relates to an image processing technique for improving dot dispersion in highlight areas and shadow areas in an error diffusion method.

The image processing device of the invention has a plurality of types of error diffusion matrices with different diffusion ranges, and selects a matrix depending on the error that has occurred, which is then used to diffuse the error into peripheral pixels. Of the plurality of error diffusion matrices, the matrix having the widest diffusion range is a matrix that diffuses error with bias in the raster direction (specifically, a matrix having a directivity factor of 2.0 or higher). If a matrix that diffuses error uniformly were employed where error must be diffused over a wide range, as in a highlight area or shadow area, error diffused into individual pixels is small that, in some instances, dots are formed in proximity to one another; however, where error diffusion is carried out while switching among matrices that include this kind of high directivity matrix, formation of dots in proximity to one another can be avoided.

19 Claims, 15 Drawing Sheets

Fig.7A  MATRIX A
DIFFUSION PIXEL NUMBER: 23   DIRECTIVITY FACTOR: 2.55

| * | 6 | 4 | 4 | 3 | 2 | 2 | 1 | 1 | 1 | 1 |
|---|---|---|---|---|---|---|---|---|---|---|

| 1 | 1 | 1 | 1 | 2 | 3 | 4 | 5 | 5 | 6 | 7 | 3 | 2 |

Fig.7B  MATRIX B
DIFFUSION PIXEL NUMBER: 20   DIRECTIVITY FACTOR: 2.11

| * | 7 | 4 | 4 | 3 | 2 | 2 | 1 | 1 |
|---|---|---|---|---|---|---|---|---|

| 1 | 1 | 2 | 3 | 4 | 5 | 5 | 6 | 7 | 3 | 2 | 1 |

Fig.7C  MATRIX C
DIFFUSION PIXEL NUMBER: 16   DIRECTIVITY FACTOR: 1.47

| * | 8 | 6 | 4 | 3 | 2 | 1 |
|---|---|---|---|---|---|---|

| 1 | 2 | 3 | 4 | 5 | 6 | 8 | 6 | 3 | 2 |

Fig.7D  MATRIX D
DIFFUSION PIXEL NUMBER: 12   DIRECTIVITY FACTOR: 0.84

| * | 6 | 3 | 2 | 1 |
|---|---|---|---|---|

| 1 | 1 | 2 | 4 | 6 | 3 | 2 | 1 |

Fig.7E  MATRIX E
DIFFUSION PIXEL NUMBER: 9   DIRECTIVITY FACTOR: 0.69

| * | 3 | 2 | 1 |
|---|---|---|---|

| 1 | 1 | 2 | 3 | 2 | 1 |

Fig.7F  MATRIX F
DIFFUSION PIXEL NUMBER: 7   DIRECTIVITY FACTOR: 0.38

| * | 3 | 2 |
|---|---|---|

| 2 | 3 | 4 | 1 | 1 |

Fig.10A
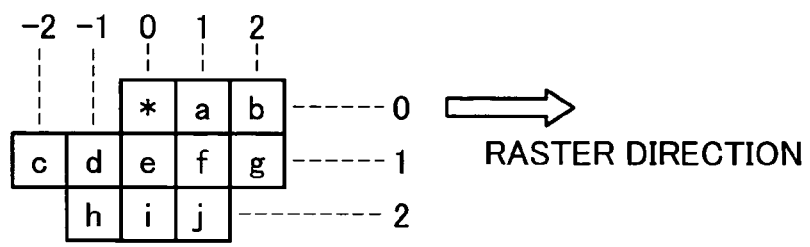
Fig.10B
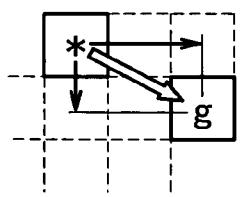
Fig.10C
DIRECTIVITY FACTOR = ( (a+2b+2c+d+f+2g+h+j)
　　　　　　　　　　　−(c+d+e+f+g) − 2(h+i+j) ) / SUM
: SUM = a+b+c+d+e+f+g+h+i+j

DIFFUSION PIXEL NUMBER: 17    DIRECTIVITY FACTOR: 0.68

DIFFUSION PIXEL NUMBER: 7    DIRECTIVITY FACTOR: 0.38

DIFFUSION PIXEL NUMBER: 33    DIRECTIVITY FACTOR: 2.44

DIFFUSION PIXEL NUMBER: 29    DIRECTIVITY FACTOR: 2.07

Fig.15A
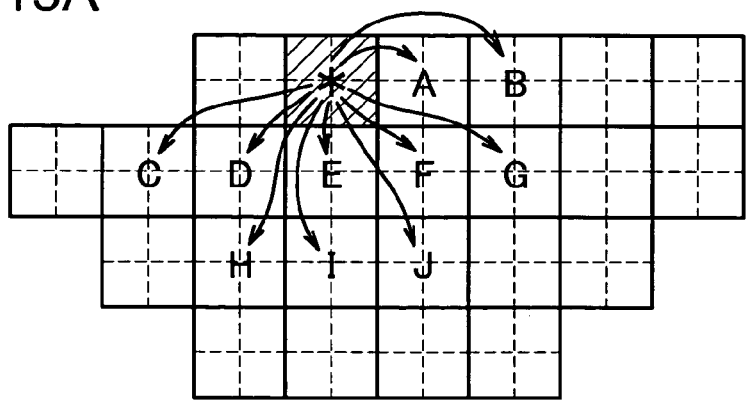
Fig.15B
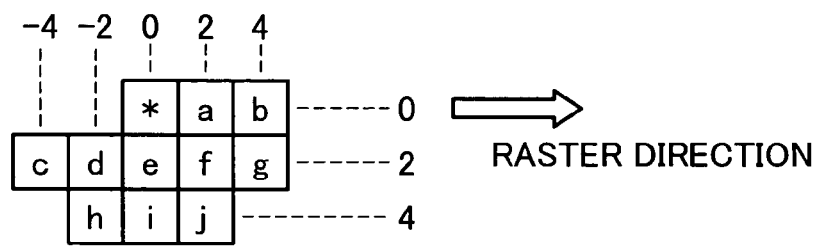
RASTER DIRECTION
Fig.15C
DIRECTIVITY FACTOR = ( (2a+4b+4c+2d+2f+4g+2h+2j)
                      -2(c+d+e+f+g) - 4(h+i+j) ) / SUM
: SUM = a+b+c+d+e+f+g+h+i+j

IMAGE PROCESSING TECHNIQUE FOR TONE NUMBER CONVERSION OF IMAGE DATA

BACKGROUND OF THE INVENTION

1. Field of the Invention

This invention relates to a technique for converting multitone image data into pseudo-tone data represented by the dot on-off state.

2. Description of the Related Art

Ink jet printers, liquid crystal displays, and other image/video display devices that represent an image by creating dots on a display medium enjoy widespread use as output devices for computer-created images, images shot with digital cameras, and so on. In order to represent a multitone image using an ink jet printer or other image display device of this kind, the multitone image data for the image must first be converted into pseudo-tone data represented by the dot on-off state. While a number of methods have been proposed for performing this conversion, a typical method that is widely used at present is the so-called error diffusion method.

The error diffusion method involves deciding the dot on-off state for a given pixel, and diffusing the tone representation error (hereinafter, this error shall be termed tone error) into unprocessed neighboring pixels. When deciding the dot on-off state for an unprocessed pixel, the dot on-off state is decided upon so as to cancel out error diffused from neighboring pixels in this manner. Taking the case of an ink jet printer by way of example in the following description, if it has been decided for example to produce a dot in a highlight area of high brightness level in the image, large tone error will be produced for that pixel. By diffusing this error into unprocessed neighboring pixels to make dot formation less likely in the neighboring pixels, the error can be cancelled out overall. Conversely, in a shadow area having low brightness in an image, if it has been decided to not form a dot, large tone error will result. By diffusing the tone error created by this pixel into neighboring pixels to make dot formation more likely in the neighboring pixels, the error can be cancelled out overall.

In contrast to an ink jet printer, with a video display that produces an image display composed of luminescent spots, such as a liquid crystal display, large tone error will result from a decision to not form a dot in a highlight area, or a decision to form a dot in a shadow area. As regards liquid crystal displays, since the relationship between dot on-off status and production of tone error is the reverse of that for an ink jet printer, they can be considered in terms of an ink jet printer. To avoid excessively complicated description, the following description shall assume an ink jet printer; however, it would apply analogously to a liquid crystal display or similar device.

In the error diffusion method, the neighboring pixel range into which tone error will be diffused, and the weighting factor employed when diffusing the error into neighboring pixels, are precalculated in a numerical table termed an error diffusion matrix. Tone error is diffused into neighboring pixels in accordance with this matrix. To achieve higher picture quality, it has been proposed to use different error diffusion matrices depending on tone value of the image data (for example, Unexamined Patent Application 7-226841).

For example, since, in a highlight area, it is desirable for dots to be distributed sparsely (i.e., with dots spaced far apart), it is effective to employ an error diffusion matrix having a large diffusion range. By so doing, when a dot is produced on a given pixel, the tone error resulting therefrom is diffused into a wide neighboring range, dot formation can be made less likely in the neighboring area of the dot, so that dispersion of dots can be improved. In other words, in a highlight area, in order to make formation of additional dots unlikely in proximity to a pixel having a dot formed thereon, it is desirable to employ an error diffusion matrix whereby tone error produced by a given pixel maybe diffused in to a wide range neighboring the pixel. Similarly, in a shadow area, as it is desirable in terms of picture quality for pixels having no dots formed thereon to be distributed sparsely, the use of a large error diffusion matrix is preferred. By so doing, tone error resulting when a dot is not formed may be diffused into a wide neighboring range, thereby improving dispersion of dots to give better picture quality. In contrast to the above, in middle tone areas containing both dot-on pixels and dot-off pixels formed at relatively high density, dot dispersion is not appreciably worsened by the use of a small error diffusion matrix having a narrow diffusion range, and has the advantage of actually reducing the number of pixels into which error must be diffused, producing a commensurate speedup in processing for conversion of the image data.

It will thus be apparent that, in terms of picture quality, for highlight areas and shadow areas it is desirable to use as large an error diffusion matrix as possible, so as to diffuse tone error over a wide range. However, there have been encountered instances in which, despite the use of an error diffusion matrix having a wide diffusion range, dots nevertheless are formed relatively close together so that picture quality is not improved to the extent expected.

The present invention is intended to address the issues in the prior art discussed above, and has as an object to provide a technique for effective improvement of dot dispersion in highlight areas and shadow areas.

SUMMARY OF THE INVENTION

To address at least some of the aforementioned issues, the image processing technique of the invention comprises converting multitone image data into data of a format represented by the dot on-off state; and diffusing the tone error produced by said conversion in a pixel of interest into unprocessed pixels neighboring the pixel of interest. The error diffusion matrix referred to during diffusion is one matrix selected, with reference to the image data of the pixel of interest, from among a number of precalculated matrices with different diffusion ranges. Here, the wide-diffusion range error diffusion matrices are matrices precalculated to diffuse tone error with bias to raster direction. A specific example of a matrix for diffusing tone error with bias to raster direction would be one having a directivity factor, calculated in the manner described hereinbelow, of at least 2.0, and preferably a directivity factor of 2.5 or higher.

When converting image data to data of format represented by the dot on-off state, since diffusion of tone error produced by a pixel of interest into neighboring unprocessed pixels makes it possible when effecting conversion to give consideration to tone error diffused from neighboring pixels, it becomes possible to convert image data more appropriately. However, since tone error is diffused over a wide range, and as a result tone error diffused into each individual pixel is minimal, it becomes difficult to convert the data so as to properly reflect the diffused tone error. In contrast, through the use of an error diffusion matrix that diffuses tone error with bias to raster direction, it becomes possible to give proper consideration to diffused tone error (at least as far as the raster direction is concerned), and thus to appropriately convert image data into data of format represented by the dot on-off state. Of course, diffusing tone error with bias to raster direction will have the effect of reducing diffused error in the direction orthogonal to the rasters, making it difficult to give proper consideration to error as far as the orthogonal direction is concerned. However, as the need to diffuse tone error over a wide range is frequently associated with sparsely formed dots or with sparsely formed pixels having no dots formed thereon, the failure to give proper consideration to error in the orthogonal direction presents no practical difficulties, provided that error in the raster direction is given proper consideration.

In this image processing device and image processing method, an error diffusion matrix with a wider diffusion range maybe selected for a pixel of interest having less image data.

The less image data there is, the more sparsely dots will need to formed. Thus, by diffusing tone error using a matrix with a wider diffusion range for pixels of interest having less image data, it is possible to produce dots more sparsely.

When selecting an error diffusion matrix, selection may take into consideration the conversion result of the pixel of interest, in addition to the image data of the pixel of interest.

Tone error created by a pixel of interest is affected not only by the image data for the pixel of interest, but also by the conversion result of the pixel of interest; by giving consideration to both of these, it is possible to select a more appropriate error diffusion matrix.

The plurality of precalculated error diffusion matrices may consist of matrices having greater directivity factor in association with wider diffusion range.

Since tone error diffused into individual pixels is smaller with a wider diffusion range, when converting image data for these pixels, it is difficult to give proper consideration to diffused tone error. Accordingly, by providing matrices that have greater directivity factor in association with wider diffusion range, it becomes possible to give proper consideration to diffused tone error while converting the image data.

For an error diffusion matrix having strong directivity, specifically, a directivity factor of 2.0 or higher, a matrix with a diffusion range limited to within the raster containing the pixel of interest and two rasters adjacent to this raster, would be acceptable.

Experience has shown that, by limiting the diffusion range of the error diffusion matrix to within the raster containing the pixel of interest and one raster adjacent to this raster, it is a simple matter to create a matrix having a directivity factor of 2.0 or higher.

An additional advantage is that, for an error diffusion matrix having a wide diffusion range, by limiting the diffusion range to within two rasters tone error can be diffused into fewer pixels and image data can be converted faster to a commensurate degree.

In image processing of the present invention, for a pixel of interest located in a low tone area or a high tone area and having a said tone difference that is above a predetermined value, it would be acceptable to select the matrix having the widest diffusion range in the raster direction, to diffuse the tone error produced by the pixel. The predetermined value for comparison with tone difference is advantageously a tone value equivalent to ½ or greater the tone value that can be assumed by the image data.

For a pixel that produces a large tone error, such as where a dot is produced in a low tone area (highlight area) or where no dot is produced in a high tone area (shadow area), it is preferable to use an error diffusion matrix having a wider diffusion range, so as to diffuse the error over a wider range. However, when it is attempted to diffuse tone error over a wide range, the result is that tone error diffused into individual pixels is rather small, making it difficult to convert the image data while properly reflecting the diffused tone error. Accordingly, where large tone error has been produced, there is selected from among a plurality of precalculated error diffusion matrices a matrix that diffuses tone error with bias to raster direction. By so doing, it becomes possible to properly reflect produced tone error in the dot on-off state decision, at least as far as the raster direction is concerned.

That is, where a pixel of interest is located in either a low tone area or a high tone area, and moreover tone difference for the pixel of interest (the absolute value of the difference between tone value represented for the pixel of interest by the dot on-off state, and the tone value of the image data) is above a predetermined value, the matrix having the widest diffusion range in the raster direction is used, whereas other matrices are used in other instances. Typically, since dots are formed sparsely in low tone areas (highlight areas) and are formed at high density in high tone areas (shadow areas), selection of matrices in the above manner will substantially never result in consecutive selection of matrices with wide diffusion range. Thus, even where error has been diffused with a bias to raster direction, it is possible for error to be intermittently diffused in the direction orthogonal to the raster direction as well.

When performing error diffusion, there maybe precalculated, in addition to a matrix having aforementioned directivity factor above 2.0, matrices having low directivity, and a matrix having low directivity used for a pixel of interest whose tone difference is smaller than the aforementioned predetermined value. As matrices having low directivity, there could be employed matrices having directivity factors of 1.0 or less, preferably ones having directivity factors of 0.5 or less.

By switching among matrices in this way, diffused tone error can be efficiently dispersed in direction orthogonal to the rasters, on an intermittent basis using a matrix having low directivity, while at the same time appropriately diffusing error in the raster direction using a matrix having high directivity. As a result, occurring tone error can be reflected appropriately in the decision as to dot on-off state over a wide range of pixels.

In the above-described image processing device and image processing method, the error diffusion matrix having the widest diffusion range may be selected in the event that the tone value of a pixel of interest is below the aforementioned first threshold value, and a dot has been formed on the pixel of interest. Alternatively, the error diffusion matrix having the widest diffusion range may be selected in the event that the tone value of a pixel of interest is greater than the aforementioned second threshold value, and a dot has not been formed on the pixel of interest.

In the above instances, large tone error will be produced for the pixel of interest, and thus by selecting the error diffusion matrix having the widest diffusion range in the raster direction, it is possible to appropriately reflect tone error with pixels in a wide range. The second tone value may be a greater value than the first tone value.

In the above-described image processing device and image processing method, an error diffusion matrix having a wider diffusion range in the raster direction may be selected where, in addition to the two conditions noted previously, a larger tone error is produced by a pixel of interest.

By so doing, tone error produced by a pixel of interest may be diffused more appropriately so as to reflect the error in the dot on-off state decisions for neighboring pixels.

At this time it is possible to select a matrix with a large directivity factor, the wider the diffusion range of the error diffusion matrix.

Since a wider diffusion range means diffusion of smaller error into individual pixels, it is difficult to reflect occurring tone error in the dot on-off state decision. Accordingly, by employing a matrix with a large directivity factor the wider the diffusion range of the error diffusion matrix, it becomes possible to diffuse the occurring tone error into a wide range of pixels so as to be appropriately reflected in the dot on-off state decision.

For an error diffusion matrix having strong directivity, specifically, a directivity factor of 2.0 or higher, a matrix with a diffusion range limited to within the raster containing the pixel of interest and two rasters adjacent to this raster, would be acceptable.

Experience has shown that, by limiting the diffusion range of the error diffusion matrix to within the raster containing the pixel of interest and two rasters adjacent to this raster, it is a simple matter to create a matrix having a directivity factor of 2.0 or higher.

An additional advantage is that, for an error diffusion matrix having a wide diffusion range, by limiting the diffusion range to within two rasters, tone error can be diffused into fewer pixels and image data can be converted faster to a commensurate degree.

As an error diffusion matrix having a directivity factor of 2.0 or higher, there could be employed a matrix wherein, for a distance beyond a predetermined distance in the raster forward direction (i.e. the direction in which image data is converted along a raster from a pixel of interest), diffusion range is limited to within either the raster including the pixel of interest, or a raster neighboring this raster. There could also be used a matrix wherein, in the opposite direction from the raster forward direction, diffusion range is limited to within the raster neighboring the raster that includes the pixel of interest.

Since such matrices frequently have directivity factors of 2.0 or higher, by limiting diffusion range in this way, an appropriate matrix can be created readily. Additionally, since such a matrices diffuse tone error into fewer pixels, image data can be converted faster.

For the purpose of speeding up image processing, in some instances predetermined numbers of neighboring pixels are grouped into superpixels, and image processing carried out on these superpixel units; the present invention may be effectively implemented in such instances as well. While described in greater detail later, where, for example, dots are formed on superpixels in a highlight area, or where pixels having no dots formed thereon are produced in superpixels in a shadow area, an error diffusion matrix having wide diffusion range in the raster direction is selected, and while rereading pixels as superpixels, the tone error produced by the superpixels is diffused.

In this way as well, tone error can be reflected in a wide range of pixels and image data converted while appropriately deciding dot on-off status, and is preferred for this reason.

The invention may also be realized using a computer, by having a program for realizing the above-described image processing method read by the computer. Accordingly, the invention may also be realized as such a program per se, or a storage medium having such a program stored thereon.

As long as the various functions described hereinabove can be realized using a computer that reads such a program, or a program stored on a storage medium, dispersion of dots in highlight areas and shadow areas can be effectively improved, without reducing the speed of image data conversion.

BRIEF DESCRIPTION OF THE DRAWINGS

FIGS. 7A through 7F show examples of error diffusion matrices used for the tone number conversion process of the working example.

FIGS. 10A through 10C is an illustration showing calculation of directivity factor.

FIGS. 15A through 15C are illustrations depicting implementation in an error diffusion method in which pixels are grouped into superpixels.

DESCRIPTION OF THE PREFERRED EMBODIMENTS

In order to provide a better understanding of the effects and advantages of the invention, the preferred embodiments of the invention shall be described in the following order.

A. Device Arrangement

B. Overview of Image Processing

C. Tone Number Conversion Process of the Working Example

D. Variant Examples

A. Device Arrangement

Figure 1:
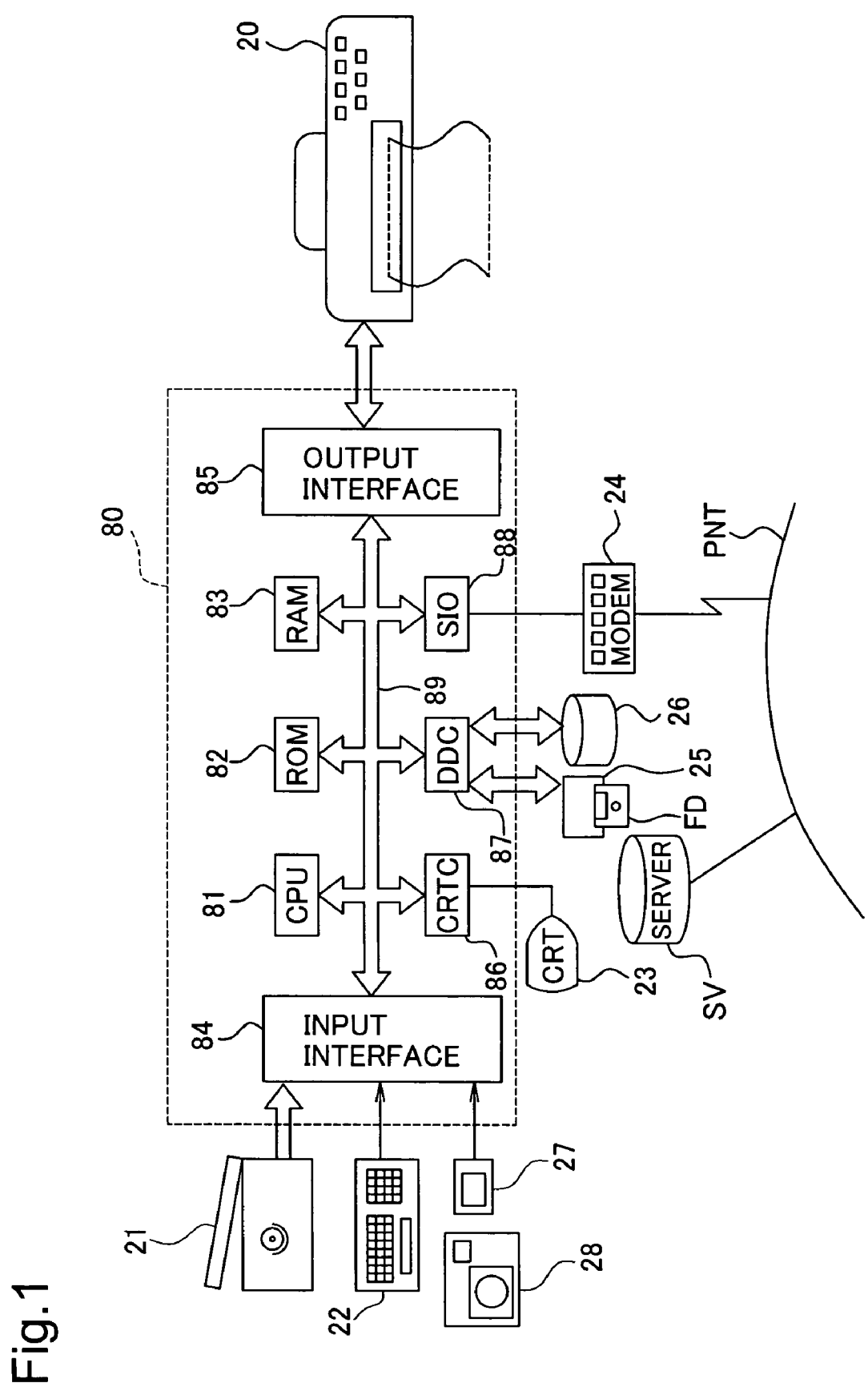
FIG. 1 is an illustration of design of a printing system comprising an image processing device according to the invention and a printing device.

FIG. 1 illustrates the design of a printing system 10 comprising an image processing device according to the invention and a printing device. As shown in the drawing, this printing system 10 comprises a printer 20 connected to a computer 80. When a predetermined program being loaded on the computer 80 is run, computer 80 and printer 20 function overall as an integrated printing system 10. Here, an image created by any of various application programs 91 on computer 80 is used as the image for printing. It would also be possible to use an image read in by a scanner 21 connected to computer 80, or an image shot be a digital still camera (DSC) and input via a memory card 27. The image data ORG is converted by CPU 81 in computer 80 into data printable by the printer 20, and output to printer 20 as print data FNL. Through appropriate control of ink dot formation onto printer paper according to this print data FNL, printer 20 prints the final image onto printer paper.

Computer 80 comprises a CPU 81 for executing operations of various kinds, RAM 83 for temporary storage of data, ROM 82 for storing various programs, a hard disk 26, and the like. Where SIO 88 is connected to a public telephone network PNT via a modem 24, it will be possible to download to hard disk 26 any required data or programs from a server SV on an external network.

Printer 20 is an ink jet printer equipped with inks of the colors cyan (c), magenta (M), yellow (Y) and black (K), and able to print color images on printer paper by forming dots with these inks. In addition to these inks, inks of other colors such as light cyan (LC), light magenta (LM), or dark yellow (DY) could be provided as well to form dots with these inks.

Printer 20 employs a format wherein ink dots are produced on printer paper by ejecting ink using piezo elements. In the printer 20 employed in the working example, there is employed a format of ink ejection by piezo elements, but a printer equipped with a nozzle unit that ejects ink by some other format could be used. For example, the printer could be of a format whereby electrical current is passed through heaters installed in ink passages to produce bubbles in the ink passages. Additionally, printers of other formats that form ink dots using phenomena such as thermal transfer, or that form dots on printer paper with toner using electrostatic charge, could be employed instead of an ink ejection format.

Figure 2:
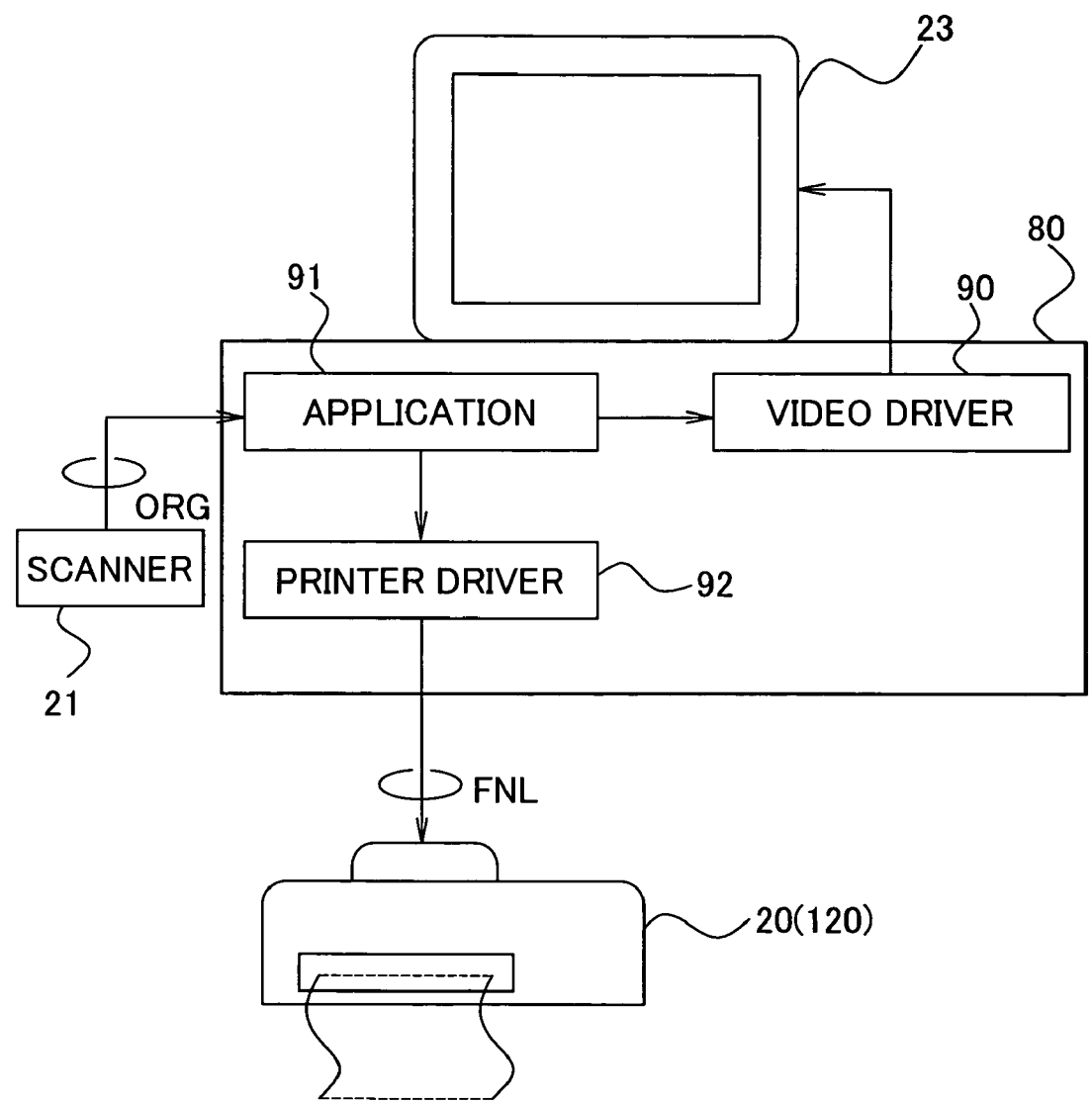
FIG. 2 shows block diagram depicting schematically a computer software arrangement for realizing the functions of the image processing device of the working example.

FIG. 2 is a block diagram depicting schematically the computer 80 software arrangement for realizing the functions of the image processing device of the working example. In computer 80, all application programs 91 run on an operating system. The operating system incorporates a video driver 90 and a printer driver 92, and image data output by an application program 91 is subjected to predetermined signal conversion by video driver 90 and then displayed on a monitor 23.

When an application program 91 issues a print command, the printer driver 92 of computer 80 receives the image data from the application program 91, performs predetermined image processing to convert it to print data FNL printable by the printer, and outputs the converted print data FNL to printer 20. Details of the image processing will be described later.

Figure 3:
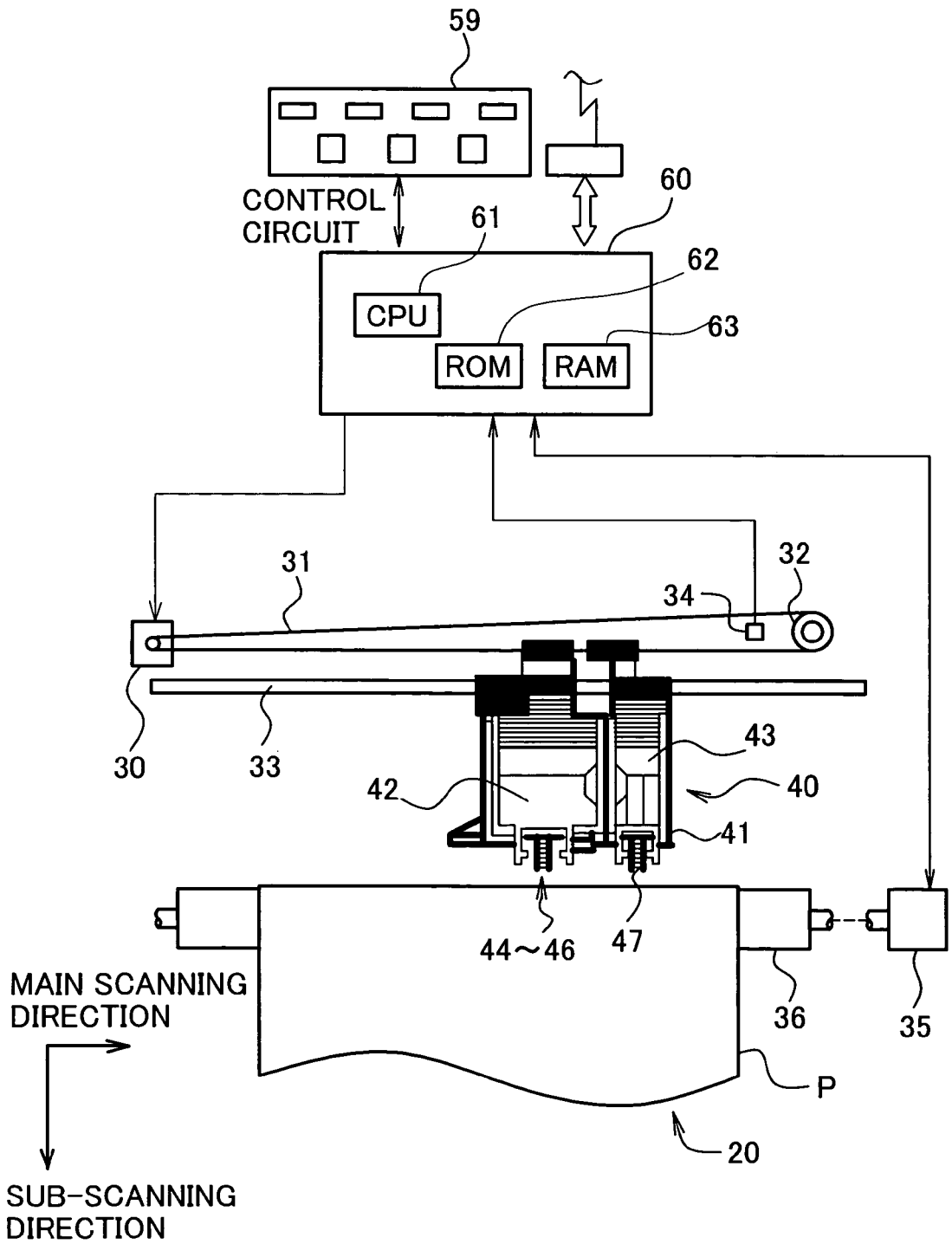
FIG. 3 is a simplified illustration of the printer in the working example.

FIG. 3 is a simplified illustration of the printer in the working example. As shown in the drawing, printer 20 comprises a mechanism for ejecting ink and forming ink dots by driving a print head 41 carried on carriage 40; a mechanism for reciprocating carriage 40 in the axial direction of a platen 36 by means of a carriage motor 30; a mechanism for transporting printing paper P by means of a paper feed motor 35; and a control circuit 60.

The mechanism for reciprocating carriage 40 in the axial direction of platen 36 comprises inter alia a slide rail 33 extending parallel to the platen 36 axis, for slidably retaining carriage 40; a pulley 32 having an endless drive belt 31 extending between it and carriage motor 30; and a position sensor 34 for sensing the home position of carriage 40.

The mechanism for transporting printing paper P comprises inter alia the platen 36; the paper feed motor 35 which turns the platen 36; an auxiliary feed roller (not shown); and a gear train (not shown) for transmitting rotation of the paper feed motor 35 to the platen 36 and auxiliary feed roller. Printing paper P is set between platen 36 and the auxiliary feed roller, and then advanced by a predetermined distance depending on the rotation angle of platen 36.

Control circuit 60 comprises a CPU 61, ROM 62, and RAM 63, and controls the various mechanisms of printer 20. That is, by controlling the operation of carriage motor 30 and paper feed motor 35, control circuit 60 controls main scanning and sub-scanning of the carriage 40, as well as controlling ejection of ink drops from the nozzles on the basis of print data FNL supplied by computer 80. As a result, ink dots are formed at the appropriate locations on the printing paper.

On carriage 40 are installed an ink cartridge 42 containing inks of the colors C, M and Y, and an ink cartridge 43 containing K ink. When ink cartridges 42, 43 are installed on carriage 40, the inks inside the cartridges are supplied to ink eject heads 44-47 for each color via injection lines, not shown. The ink supplied to each head is ejected form the ink eject head 44-47 under control of the control circuit 60.

Figure 4:
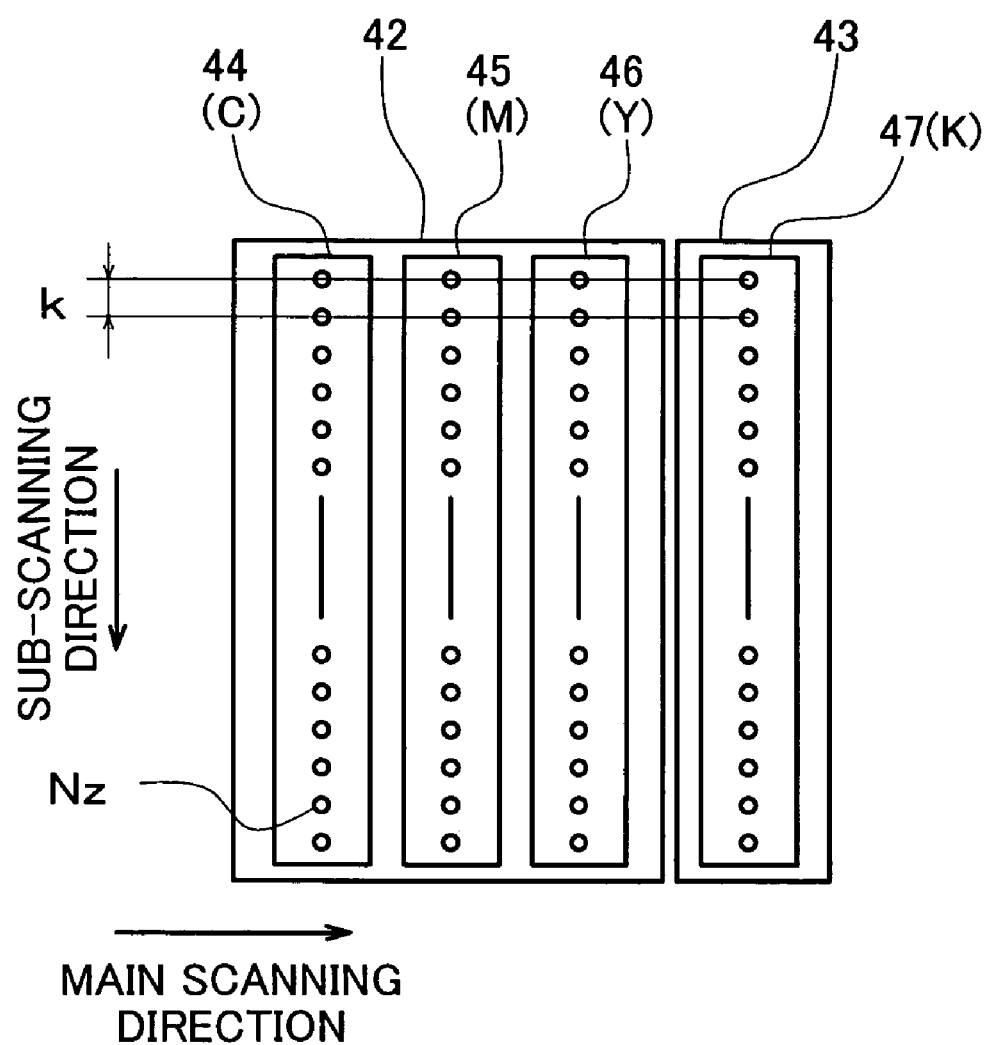
FIG. 4 is an illustration showing nozzle arrangement on the bottom faces of ink jet heads.

FIG. 4 is an illustration showing ink jet nozzle arrangement Nz on the bottom faces of ink jet heads 44-47. As shown in the drawing, four nozzle row sets for ejecting inks of the colors C, M, Y and K are disposed on the bottom faces of the ink jet heads, with the 48 nozzles Nz of each single nozzle row being arranged at a given nozzle pitch k.

In the printer 20 having the hardware configuration described above, the carriage motor 30 is driven in order to move the ink jet heads 44-47 for each color ink in the main scanning direction relative to the printing paper P; and the paper feed motor 35 is driven in order to move the printing paper P in the sub-scanning direction. Under the control of the control circuit 60, the nozzles are driven at appropriate timing while repeatedly main scanning and sub-scanning the carriage 40, to deposit drops of ink so that the printer 20 can print an image onto the printer paper.

B. Overview of Image Processing

Figure 5:
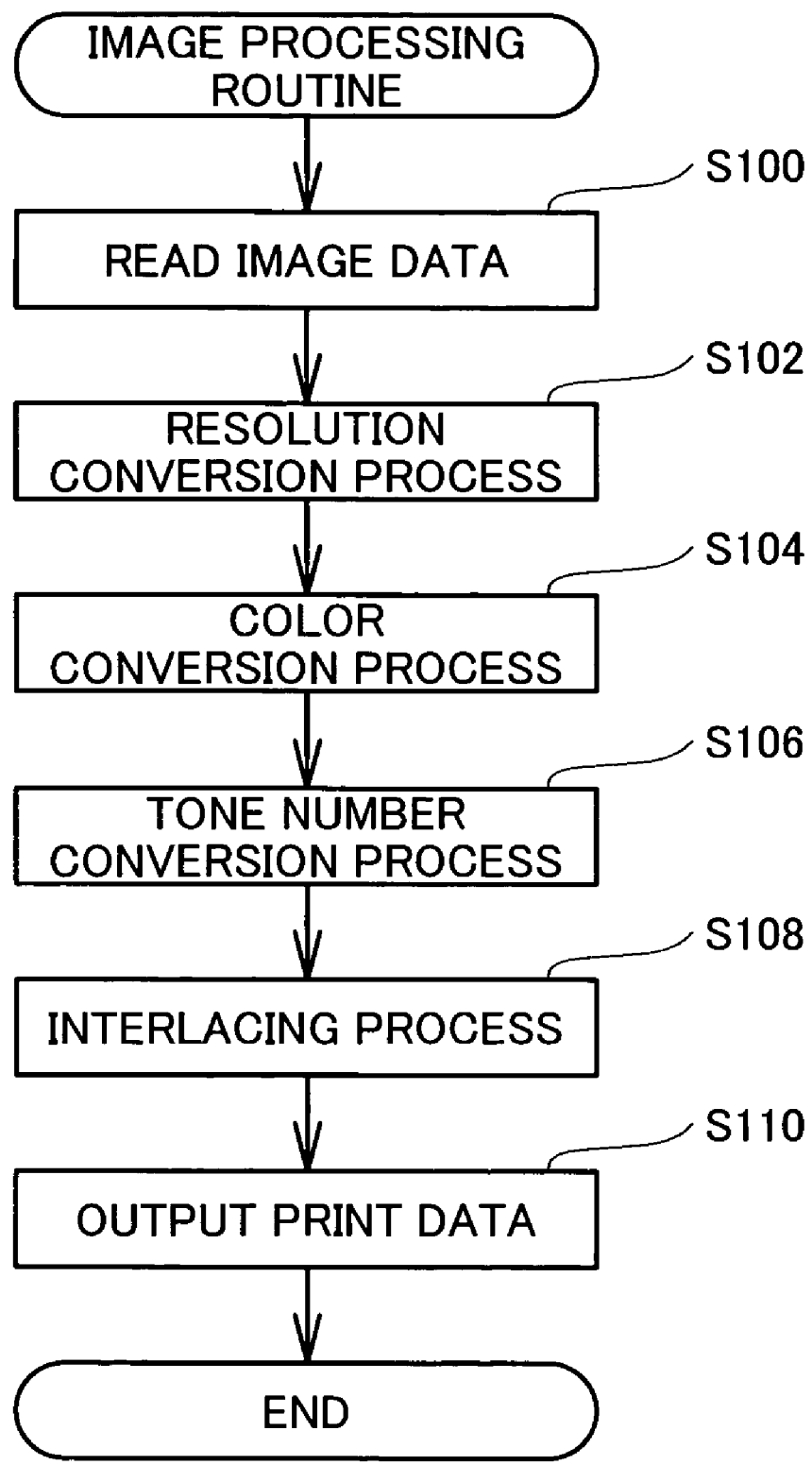
FIG. 5 is a flowchart showing process flow of conversion to print data by means of subjecting image data to predetermined image processing by a computer which is the image processing device of the working example.

FIG. 5 is a flowchart showing process flow of conversion to print data by means of subjecting image data to predetermined image processing by computer 80, the image processing device of this working example. The process is initiated by the operating system of computer 80 running the printer driver 92. The specifics of image processing will be presented in brief, with reference to FIG. 5.

When printer driver 92 initiates the image processing routine, first, an operation to read the image data to be converted is initiated (Step S100). The image data read in here in 256-tone, RGB color image data.

Next, the resolution of the acquired image data is converted to the proper resolution for printing by the printer 20 (Step S102). If image data resolution is lower than print resolution, new data points are generated between neighboring points in the existing image data by means of linear interpolation; conversely, if it is higher than print resolution, the data is thinned out at a predetermined rate, to convert the image data resolution down to print resolution.

Once resolution has been converted, the color conversion process is initiated (Step S104). The color conversion process is a process for converting RGB image data, which is represented by a combination of R, G, and B tone values, into image data represented by a combination of the colors used for printing. Since, as noted, printer 20 prints images using inks of the four colors C, M, Y, K, in the color conversion process of this working example, the RGB image data is converted into data represented by tone values for the colors C, M, Y, K. The color conversion process is carried out making reference to a three-dimensional numerical table called a color conversion table (LUT). Since the LUT contains precalculated tone values for colors C, M, Y, K derived by color conversion from RGB image data, color conversion can be performed rapidly by referring to this LUT.

Once the color conversion process has been completed, a tone conversion process is initiated (Step S106). The tone conversion process is a process such as the following. The image data obtained from the color conversion process is 256-tone data able to assume tone values of 0 to 255. In contrast, printer 20 can only assume a "dot on" or "dot off" state on the printing paper. It is accordingly necessary to convert the 256-tone image data into duotone data corresponding to the dot on-off state. This tone conversion process is therefore a process for converting 256-tone image data into data corresponding to dot on-off state (hereinafter, such data shall be referred to as dot data). In the working example, the tone conversion process is carried out using a method referred to as the error diffusion method. While a detailed description will be given later, in brief, the error diffusion method involves diffusing error according to a numerical table termed an error diffusion matrix, to obtain an image of high picture quality; in particular, in the working example, error diffusion is carried out while effectively switching between an error diffusion matrix with strong directivity in the raster direction, and a matrix with not particularly strong directivity in the raster direction.

Following the tone conversion process, an interlacing process is performed (Step S108). The interlacing process is a process for lining up the dot data (which has now been converted to a format representing the dot on-off state) in the order in which it will be sent to the printer 20, while taking into consideration the order in which dots will be produced by the printer in actual practice. The printer driver then outputs the final data from the interlacing process as print data FNL to the printer 20 (Step S110).

Printer 20 then produces ink dots of various kinds on the printing paper in accordance with the converted print data FNL. As a result, a color image corresponding to the image data is printed on the printing paper.

C. Tone Number Conversion Process of the Working Example

In the tone number conversion process of the working example, tone number is converted using a so-called error diffusion method, with effective diffusion of error being accomplished by means of effectively switching between an error diffusion matrix with strong directivity in the raster direction, and a matrix with not particularly strong directivity in the raster direction.

Figure 6:
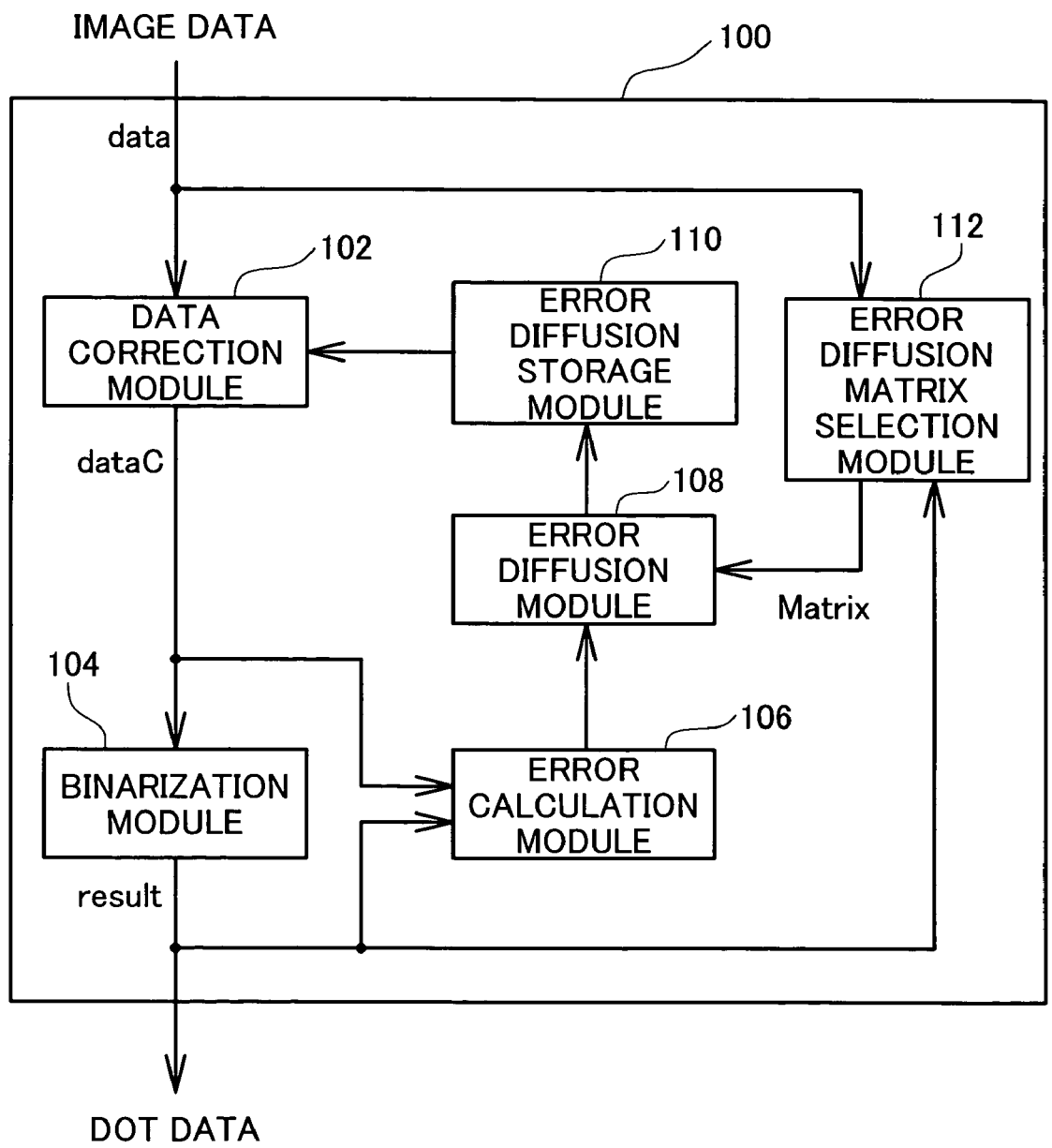
FIG. 6 shows block diagram representing conceptually the tone number conversion process of the working example executed within a computer, focusing on internal functions.

FIG. 6 is a block diagram representing conceptually the tone number conversion process of the working example executed within a computer, focusing on internal functions. The tone number conversion process may be thought of as being carried out by a combination of a plurality of modules each having its own characteristic function. In physical terms, these modules are constituted by the CPU 81, ROM 92, RAM 83 etc. inside the computer 80. The modules may be viewed overall as constituting a single module that performs the tone number conversion process (tone number conversion module 100). This tone number conversion module 100 receives color-converted image data and subjects it to predetermined processing to produce dot data. The dot data so obtained is subjected to the aforementioned interlacing process to give print data FNL printable by the printer 20. To facilitate understanding, an overview of the tone number conversion process of the working example shall be described first, making reference to FIG. 6.

Tone number conversion module 100 decides the dot on-off state one pixel at a time. First, tone number conversion module 100 inputs the color-converted image data for each color CMYK. Thereupon, the image data for a pixel of interest currently being decided upon is supplied to a data correction module 102. Within tone number conversion module 100, the same process is performed for each of the colors C, M, Y, K. To avoid unnecessary complexity, particular colors will not be specified in the following description; however, the description given without specification of particular color means that the same process is carried out for each color. For example, the image data "data" input to data correction module 102 represents image data for each of the colors C, M, Y, K.

In data correction module 102, corrected data dataC is calculated by adding together the image data data and the cumulative error diffused into the pixel of interest (hereinafter, this value is termed cumulative error accerr).

$$dataC = data + accerr$$

While the significance of the cumulative error term accerr will be described later, in general terms it may be view as a numerical value representing error which has been diffused into the pixel of interest from neighboring pixels. In this way, corrected data dataC is calculated by adding cumulative error accerr to image data data.

The corrected data dataC calculated in this manner is presented to a binarization module 104. In the binarization module 104, corrected data dataC is compared with a predetermined threshold value th in order to decide upon the dot on-off state for the pixel of interest. Specifically, if corrected data dataC is greater than threshold value th (dataC ? th), it is decided to form a dot on the pixel of interest, and a value of "1" representing dot formation is substituted into the value result indicating the binarization result. Conversely, if corrected data dataC is smaller than threshold value th (dataC<th), it is decided not to form a dot on the pixel of interest, and a value of "0" representing no dot formation is substituted into the binarization result value result. In this way, by adding cumulative error accerr to image data data to calculate corrected data dataC, and then determining the dot on-off state on the basis of the corrected data dataC, it becomes possible to cause error produced in neighboring pixels to be reflected in the dot on-off state decision.

In an error calculation module 106, the corrected data dataC and the binarization result value result are received, and an error tone err is calculated. Error tone err represents error in tone representation produced by a pixel of interest due to the dot on-off state decision for the pixel. For example, assuming that when a dot was formed a tone value of "255" is represented by a pixel of interest, error tone err occurring when a dot was formed is given by the following equation.

err=dataC−255

Where the tone value represented by a pixel of interest when no dot was formed is "0", error tone err occurring when no dot was formed can be calculated as:

err=dataC−0 (=dataC).

Error tone err calculated in this manner is presented to an error diffusion module 108. In the error diffusion module 108, a process of diffusing the supplied error tone err into unprocessed pixels neighboring the pixel of interest is performed. Diffusion of error tone err is carried out by referring to an error diffusion matrix. The error diffusion matrix stores information as to "what rate" tone error will be diffused into "which pixel" of the plurality of pixels neighboring a pixel of interest.

FIGS. 7A to 7F show examples of error diffusion matrices used for the tone number conversion process of the working example; six matrices designated Matrix A to Matrix F are shown. The significance of the drawings shall be described taking the example of Matrix F in FIG. 7F. The small squares in the drawings conceptually represent pixels. In FIG. 7F, eight neighboring pixels are shown, representing that Matrix F is composed of these eight pixels. The square containing a "*" represents a pixel of interest, and the other seven squares represent neighboring unprocessed pixels into which error tone err will be diffused. The numerical values appearing inside the neighboring pixels represent weights used when diffusing error tone err produced by the pixel of interest. That is, error tone err produced by the pixel of interest is diffused in such a way that tone error diffused into each of the pixels is distributed among them at the rates indicated within the pixels. By way of an example, the pixel situated to the right of the pixel of interest in Matrix F shall be described. Since the numerical value "3" appears in the pixel to the right of the pixel of interest, and the total of the numerical values of all neighboring pixels is "16", error equivalent to 3/16 of the error tone err will be diffused into the pixel to the right of the pixel of interest. Similarly, [error equivalent to] ¼ of the error tone err will be diffused into the pixel directly below the pixel of interest.

The six error diffusion matrices shown in FIGS. 7A to 7F are stored in an error diffusion matrix selection module 112, shown in FIG. 6. This error diffusion matrix selection module 112 receives image data data and binarization result value result, and selects from among the plurality of stored matrices a suitable error diffusion matrix Matrix in the following manner, which is then presented to error diffusion module 108. The following description makes reference to FIG. 8.

Figure 8:
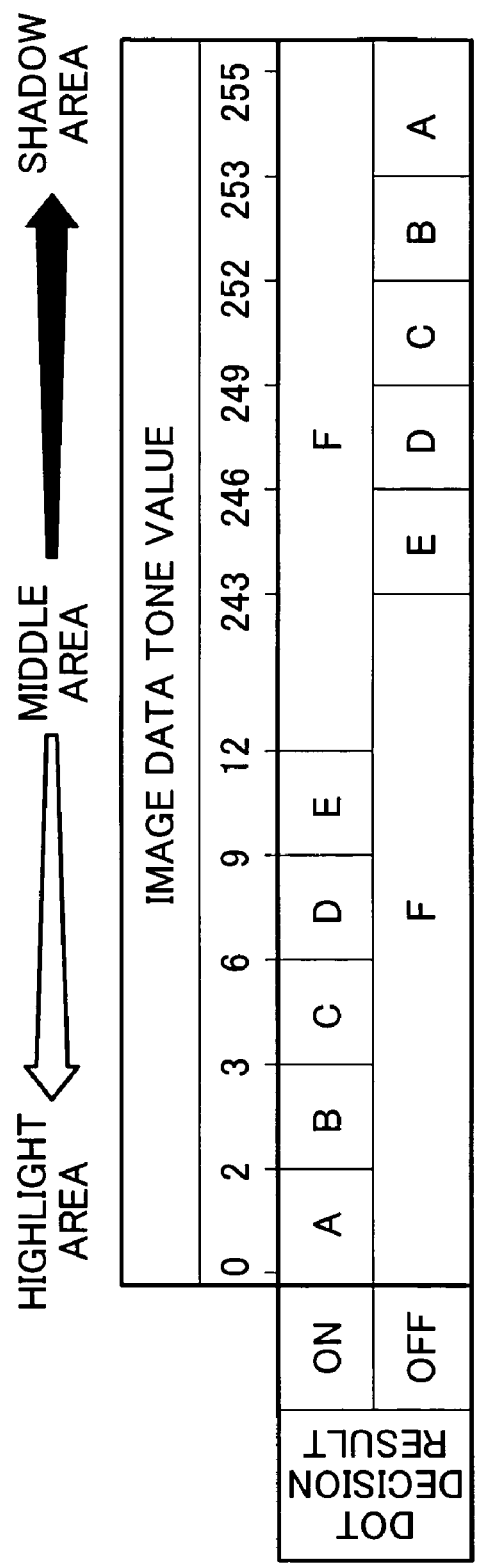
FIG. 8 is a conceptual illustration of error diffusion matrix selection depending on tone error.

FIG. 8 illustrates selection of an error diffusion matrix Matrix by error diffusion matrix selection module 112, on the basis of image data data and binarization result value result; the upper field in the drawing represents tone values of the image data data. The small tone value area corresponds to a highlight area, transitioning with increasing tone value into a middle area and then a shadow area. Dot on-off state is indicated at left in the drawing. The dot on-off state decision result can assume either an "ON" (dot formation) or "OFF" (no dot formation) state.

As shown in FIG. 8, in the event that a dot will be formed on the pixel of interest (dot decision result "ON"), and additionally the image data data of the pixel of interest is smaller than a tone value of 2 (i.e., the pixel of interest is situated in an extremely bright highlight area), Matrix A, which has the widest diffusion range in the raster direction, is selected as the error diffusion matrix Matrix. In the event that a dot will be formed on the pixel of interest and additionally the image data data is a tone value of 3, Matrix B, which has the second widest diffusion range, is selected. Subsequently, in the same manner, Matrix C is selected where image data data has tone values ranging from 3 to 6, Matrix D where image data data has tone values ranging from 6 to 9, Matrix E where image data data has tone values ranging from 9 to 12, and Matrix F where image data data has tone values above 12.

In the event that a pixel of interest is situated in a shadow area, the relationship is the exact opposite of that for a highlight area described previously. Specifically, in the event that no dot will be formed on the pixel of interest (dot decision result "OFF"), and additionally the image data data of the pixel of interest is greater than a tone value of 253, Matrix A is selected. Matrix B is selected in the event that no dot will be formed and the image data data is a tone value of 252, Matrix C where image data data has tone values ranging from 249-252, Matrix D where image data data has tone values ranging from 246-249, Matrix E where image data data has tone values ranging from 243-246, and Matrix F where image data data has tone values below 243.

In the preceding description, an appropriate matrix is selected on a case by case basis depending on a particular combination of tone value of the image data of the pixel of interest, and whether or not a dot will be formed. Of course, selection is not limited thusly to a case by case basis; it would be possible also to select an appropriate matrix on the basis of the absolute value of the difference between image data data of the pixel of interest, and the tone value represented by the pixel of interest (herein termed tone difference ervl). For example, where a dot will be formed on the pixel of interest, tone difference ervl is calculated by:

ervl=abs (data−255)

and where no dot will be formed, tone difference ervl is calculated by:

ervl=abs (data−0)=*abs(data)*.

Here, abs is an operator for calculating absolute value; for example, abs (X) denotes the absolute value of X. When tone difference ervl is "253"-"255", Matrix A is selected as the error diffusion matrix Matrix. Matrix B is selected when tone difference ervl is "252", Matrix C when tone difference ervl is "249"-"252", Matrix D when tone difference ervl is "246"-"249", Matrix E when tone difference ervl is "243"-"246", and Matrix E when tone difference ervl is less than "242."

In the description hereinabove, switching among error diffusion matrices by substantially the same method is performed for both highlight areas and shadow areas, but it would of course be possible to switch among matrices for only one or the other of these areas.

The error diffusion module 108 diffuses error tone err into neighboring unprocessed pixels in accordance with the error diffusion matrix Matrix selected in this manner. Diffused error tone err is stored on a pixel by pixel basis by an error diffusion storage module 110. As will be apparent from the matrices depicted in FIGS. 7A to 7F, error is diffused into a plurality of pixels from a single pixel of interest. Looked at the opposite way, a given pixel has error diffused into it from a plurality of pixels of interest. The error diffusion storage module 110 stores, on a cumulative pixel by pixel basis, the error diffused thusly from a plurality of pixels of interest. When a decision regarding dot on-off state is to be made for a pixel whose cumulative error is stored, the error stored in the error diffusion storage module 110 is read out and reflected in the dot on-off state decision. That is, the cumulative error accerr which is added to the image data data by the data correction module 102 represents error diffused thusly from a plurality of pixels of interest, and accumulated on a pixel by pixel basis by the error diffusion storage module 110.

The tone number conversion module 100 shown in FIG. 6 performs the above process to decide dot on-off status for each pixel. In this way, dot data is generated by deciding dot on-off status for each color C, M, Y, K.

Figure 9:
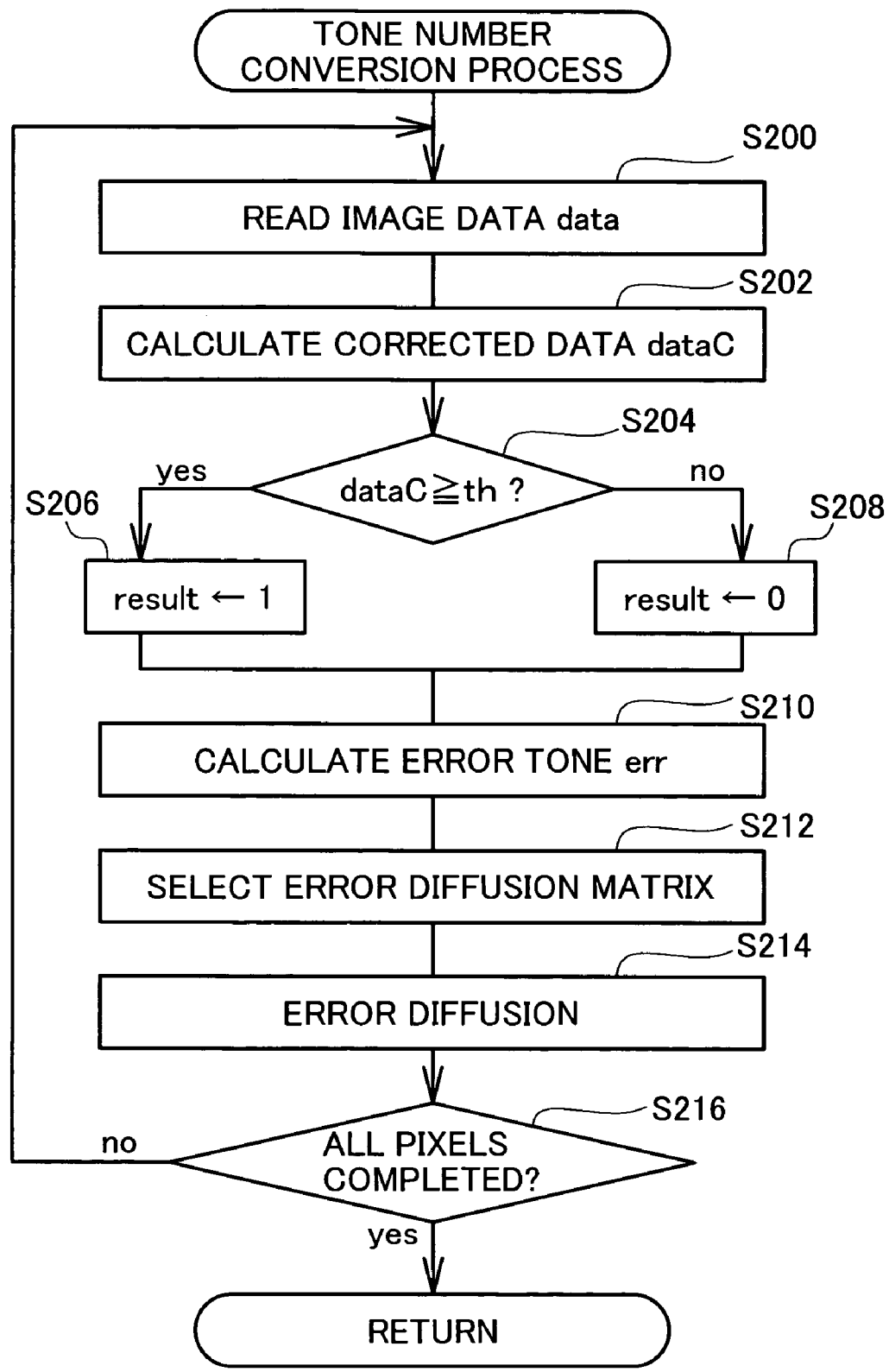
FIG. 9 is a flowchart showing process flow of the tone number conversion process of the working example.

FIG. 9 is a flowchart showing process flow of the tone number conversion process described in overview with reference to FIG. 6. The following brief description of process flow refers to the flowchart.

Upon initiation of the tone number conversion process, first, the image data data for the pixel of interest is read out (Step S200). Next, the stored cumulative error accerr associated with the image data data is read out, and added to the image data data to calculate corrected data dataC (Step S201).

The corrected data dataC so obtained is compared with a predetermined threshold value th, to decide the dot on-off status for the pixel of interest (Step S204). The threshold value th is set to the median tone value (tone value 128) of the tone value represented by a pixel having a dot formed thereon (tone value 225) and the tone value represented by a pixel having no dot formed thereon (tone value 0). There is no need for the threshold value th to be fixed; it is possible for it to vary depending on image data tone value and the dot on-off status decision result, so as to achieve better picture quality.

In the event of a decision that corrected data dataC is greater than threshold value th (Step S204: yes), it is decided to form a dot on the pixel of interest, and a value of "1" is substituted into the value result indicating the binarization result (Step S206). That is, where a "1" has been substituted into the result, this means that a dot will be formed on that pixel. Conversely, a decision that corrected data dataC is smaller than threshold value th (Step S204: no), it is decided not to form a dot on the pixel of interest, and a value of "0" is substituted into the binarization result value result (Step S208). That is, where a "0" has been substituted into the result, this means that no dot will be formed on that pixel.

Next, the tone representation error (error tone err) occurring due to the dot on-off status decision regarding the pixel of interest is calculated (Step S210). Here, since a pixel having a dot formed thereon represents a tone value of 255 and a pixel having no dot formed thereon represents a tone value of 0, error tone err in the case of a dot being formed can be calculated by the expression (dataC−255). Where no dot will be formed, error tone err is equal to dataC.

Next, a process for selecting an error diffusion matrix is performed (Step S212). The six matrices depicted in FIGS. 7A to 7F have been precalculated as error diffusion matrices, and the appropriate error diffusion matrix Matrix is selected on the basis of tone error and the dot on-off state decision result (see FIG. 8).

Using the error diffusion matrix Matrix selected in this manner, a process for diffusing the error tone err occurring with the pixel of interest into neighboring unprocessed pixels is performed (Step S214). Error diffused into each pixel is stored on a pixel by pixel basis, as cumulative error accerr.

Once error tone err occurring with the pixel of interest has been diffused in this manner, it is decided whether or not the dot on-off state decision has been made for all pixels (Step S216), and if unprocessed pixels remain (Step S216: no), the system returns to Step 200 and performs the subsequent series of processes. Once it has been decided that the dot on-off state decision has been made for all pixels (Step S216: yes), the system exits the tone number conversion process depicted in FIG. 9, and returns to the image processing routine depicted in FIG. 5.

In the tone number conversion process of the working example described above, the error diffusion matrix that diffuses the error tone err over the widest range is the matrix that diffuses error with bias in the left-right direction (raster direction or sub-scanning direction). Herein, the directivity factor is used as an index indicating the level of error diffusion biased in the left-right direction. While the method for calculating the directivity factor will be described later, generally, the directivity factor assumes a higher value the greater the level of error diffusion biased in the left-right direction. Where error is diffused using an error diffusion matrix with a large directivity factor, error tone err will not be diffused uniformly into neighboring pixels centered around the pixel of interest, but instead diffused with bias to the left-right direction. In the tone number conversion process of the working example, apart from the issue of whether calculation is explicit or not, the selected matrix is switched depending on tone error. Where tone error is greater than a predetermined value, the error diffusion matrix having the widest diffusion range is selected. By diffusing error tone err while switching matrices in this way, uniform dispersion in highlight areas and shadow areas becomes possible. Additional description of this will be provided later, with reference to a different drawing.

In the working example, as regards the error diffusion matrix having at least the widest diffusion range, not only does the matrix have strong directivity, but its diffusion range is limited to within the raster containing the pixel of interest and two rasters adjacent to this raster. Thus, the number of pixels into which error is diffused is small in comparison to distance over which tone error is diffused, so that image data can be converted rapidly. That is, the speed of image data conversion and dispersion of dots can be improved simultaneously.

Hereinbelow, description of the method for calculating the directivity factor will be followed by description of the reasons why these advantages are achieved by using a matrix with strong directivity as the error diffusion matrix having the widest diffusion range.

FIGS. 10a to 10C illustrate calculation of the directivity factor. The following description takes the error diffusion matrix shown in FIG. 10A by way of example. In FIG. 10A, the small square indicated by a "*" is the pixel of interest, the other squares representing neighboring pixels into which error tone err produced by the pixel of interest will be diffused. Weights for diffusion of the error tone err are indicated inside the neighboring pixels. For example, error tone err is diffused at weight "a" into the neighboring pixel to the right of the pixel of interest, and at weight "b" into the pixel to the right thereof. Error tone err is diffused at weight "e" into the pixel directly below the pixel of interest. Where error is diffused from the pixel of interest into the adjacent right pixel (the pixel indicated by weight "a") or the pixel adjacent right thereto (the pixel indicated by weight "b"), it can be said that error tone err is diffused along the raster direction; where diffused into the pixel directly below (the pixel indicated by weight "e"), error is not diffused along the raster direction. That is, depending on the location of the pixel into which error tone err is being diffused, certain pixels will contribute to directivity in the raster direction, while other pixels will not. By noting each individual pixel and taking into consideration whether or not the pixel is one that contributes to directivity in the raster direction, the directivity factor of the error diffusion matrix overall can be calculated.

In the example shown in FIG. 10A, let it be assumed that error tone err is diffused from the pixel of interest into the pixel indicated by weight "g". FIG. 10B illustrates conceptually the process of diffusion of error tone err, focusing on the pixel indicated by weight "g" and the pixel of interest. The pixel indicated by weight "g" is a two-pixel distance away from the pixel of interest in the raster direction, and one-pixel distance away from the pixel of interest in the raster-orthogonal direction. Considering now the directivity factor for diffusion from the pixel of interest to the pixel indicated by weight "g", this directivity factor is given by the expression: $(2-1)*g/SUM$. Here, SUM is the sum of weights for all pixels ($=a+b+c+d+e+f+h+i+j$). This may be expressed more generally as follows. Where error is diffused from into a pixel situated an N-pixel distance ahead of (or an N-pixel distance behind) the pixel of interest, and an M-pixel distance away in the raster-orthogonal direction, the directivity factor can be calculated as $$\text{directivity factor} = (N-M)*n/SUM$$

where "n" is the weight of the pixel. Here, SUM is the total value of the "weights" for all pixels in the hypothetical error diffusion matrix.

By similarly calculating directivity factor for the other pixels contained in the error diffusion matrix and adding these up, a directivity factor for the error diffusion matrix overall can be calculated. FIG. 10C shows an equation for calculating a directivity factor for the matrix of FIG. 10A.

The error diffusion matrices shown in FIGS. 7A to 7F are all depicted together with their directivity factors calculated in this manner. Of the several matrices shown in FIGS. 7A to 7F, the largest error diffusion matrix (Matrix A) has a directivity factor of "2.55." In this way, by employing, for the error diffusion matrix having at least the largest diffusion range, a high directivity matrix having a large directivity factor value, it becomes possible to uniformly disperse dots in highlight areas and shadow area. Experience has shown that where directivity factor is 2.0 or higher, the error diffusion matrix can be considered to have strong directivity, and that where directivity factor is 2.5 or higher the error diffusion matrix may be considered to have ample directivity.

Figure 11A:
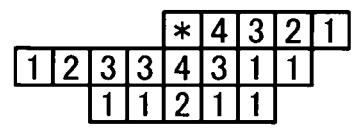
FIGS. 11A and 11B show examples of typical error diffusion matrices used in ordinary error diffusion methods.
Figure 11B:
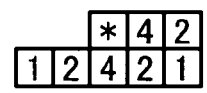

For reference, examples of typical error diffusion matrices that may be employed in ordinary error diffusion methods are shown in FIGS. 11A and 11B. When directivity factors are calculated for these two exemplary error diffusion matrices, the directivity factor for the matrix with the smaller diffusion range is 0.38, while that for the larger matrix is 0.68. From a comparison with these matrices, it will be understood that matrices having a directivity factor of 2.0 or higher are atypical. The following description pertains to the reasons why good picture quality is achieved by employing a high directivity matrix for the error diffusion matrix having at least the widest diffusion range, and by switching among error diffusion matrices when diffusing errors.

In the first instance, areas for which the error diffusion matrix having the widest diffusion range will be used will include areas in which dots are sparsely formed (such as highlight areas) and areas in which pixels with no dots are sparsely present (such as shadow areas). For example, in a highlight area, it is preferable for distances among sparsely formed dots to be substantially uniform in all directions. Accordingly, where a dot has been formed on a pixel of interest, it is normal to conceive of diffusing error tone err uniformly into neighboring pixels, so that dots are not likely to be formed on pixels within in predetermined distance centered on the pixel of interest. That is, a matrix giving uniform diffusion of error tone err is used as the error diffusion matrix.

Incidentally, with a wider diffusion range and a greater number of pixels into which the error tone err is diffused, the error diffused into each individual pixel is smaller. Thus, with a wider diffusion the range, only slight error is diffused from the pixel of interest, making it more difficult to adequately suppress dot formation on pixels into which error has been diffused. Accordingly, where error is being diffused over a wide range, an error diffusion matrix having high directivity is used to diffuse the error tone err with bias towards the raster direction. By so doing, where a dot has been formed on a pixel of interest in a highlight area, error tone err may also be adequately diffused into pixels situated further away from the pixel of interest in the raster direction, making it possible to effectively inhibit dot formation.

Of course, with the use of such a high directivity matrix, error cannot be adequately diffused in the direction orthogonal to the raster direction. However, by switching between error diffusion matrices, in effect, error can be adequately diffused in the orthogonal direction as well, and dot formation effectively inhibited. This is described with reference to FIGS. 12A to 12C.

Figure 12A:
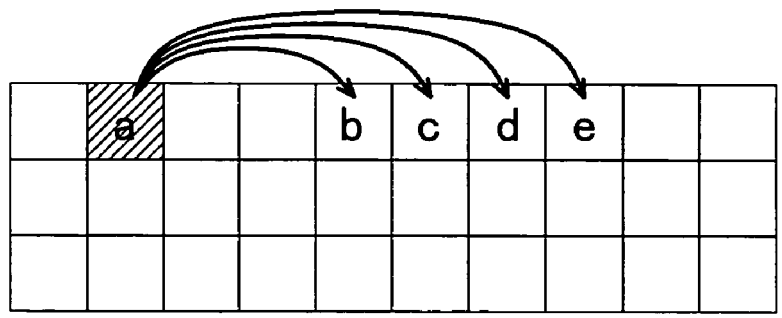
FIGS. 12A through 12C are illustration showing intermittent error diffusion in the raster-orthogonal direction, by switching the error diffusion matrix.
Figure 12B:
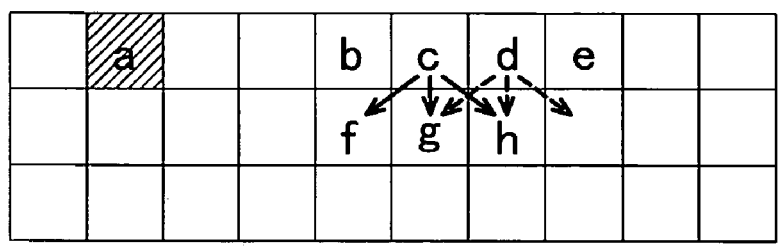
Figure 12C:
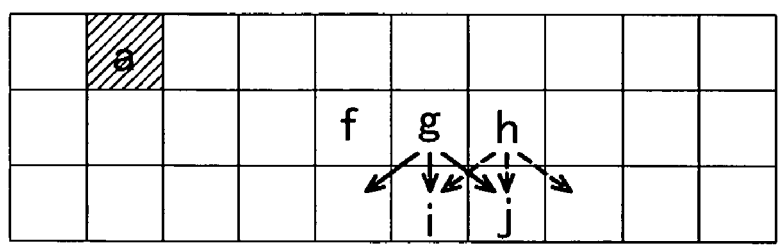

FIG. 12A depicts conceptually diffusion of error from the pixel of interest, where a dot has been formed on a pixel of interest in a highlight area. The small forward direction [Note; error for squares?] in FIGS. 12A to 12C represent pixels, and the square shape to indicated by the diagonal line represents the pixel of interest a. As described with reference to FIG. 8, where a dot has been formed on a pixel in a highlight area, Matrix A (the matrix having the largest diffusion area) is selected for use as the error diffusion matrix. This matrix has high directivity in the raster direction. Thus, error tone err occurring with the pixel of interest a will be effectively diffused into pixel b, pixel c, pixel d, pixel e, etc., which are situated in the same raster, as a result of which formation of dots on these pixels may be reliably inhibited. In FIG. 12A, pixels b to e in particular are depicted, but that is because it is convenient for the purposes of description to focus upon these particular pixels, among the plurality of pixels into which error is diffused from pixel a. It does not mean that error is not diffused into other pixels.

FIG. 12B depicts conceptually diffusion of error into pixel c or d situated in the same raster as pixel a. Error tone err occurring with pixel a is diffused into these pixels under relatively large weighting, so no dots will be formed on them. As a result, for these pixels, an error diffusion matrix different from Matrix A is selected (according to FIG. 8, Matrix F). In this way, for pixel c or d, an error diffusion matrix different from Matrix A is selected, and thus error produced by these pixels is effectively diffused in the raster-orthogonal direction as well (at least to a greater extent than with Matrix A). For example, as indicated by the solid arrows in FIG. 12B, error produced by pixel c will be effectively diffused into pixel f, pixel g, pixel h, etc., which are situated in the same raster. Similarly, error produced by pixel d will be effectively diffused into pixel f, pixel g, pixel h, etc. Of course, as with pixels b and e, error occurring with these pixels is effectively diffused into pixels in the adjacent raster.

Here, using a high directivity error diffusion matrix, error tone err produced by pixel a is diffused into pixels b to e with relatively large weights. Thus, for pixels f to hand other pixels situated in the adjacent raster, error will not be diffused directly from pixel a. However, since error produced by pixels in the same raster as pixel a (pixels b to e etc.) is diffused into pixels f to h etc., ultimately error from pixel a is in fact diffused into pixels f to hand other pixels situated in the adjacent raster, but this takes place indirectly, via pixels in the raster direction.

Since, in this manner, error tone err produced by forming a dot on pixel a is also diffused into pixels f to h etc. situated in an adjacent raster, formation of dots on these pixels is inhibited. As a result, a matrix other than Matrix A is selected for these pixels, and ultimately error tone err produced by pixel a is diffused into pixels i, j, etc. on the raster even further ahead, via pixels f to h etc. on the adjacent raster. FIG. 12C depicts conceptually diffusion of error produced by pixel a, via pixels on the adjacent raster into pixels on the next raster adjacent thereto.

In the working example described hereinabove, notwithstanding the use of a high directivity matrix as the error diffusion having the widest diffusion range, the result is that error is diffused appropriately into pixels in the orthogonal direction as well, so as to be reflected in the dot on-off state decisions therefor. This is because, as described hereinabove, since error diffusion matrices are switched depending on tone error, even where a high directivity matrix as the error diffusion having the widest diffusion range, error is diffused indirectly in the direction orthogonal to the rasters as well.

Figure 13A:
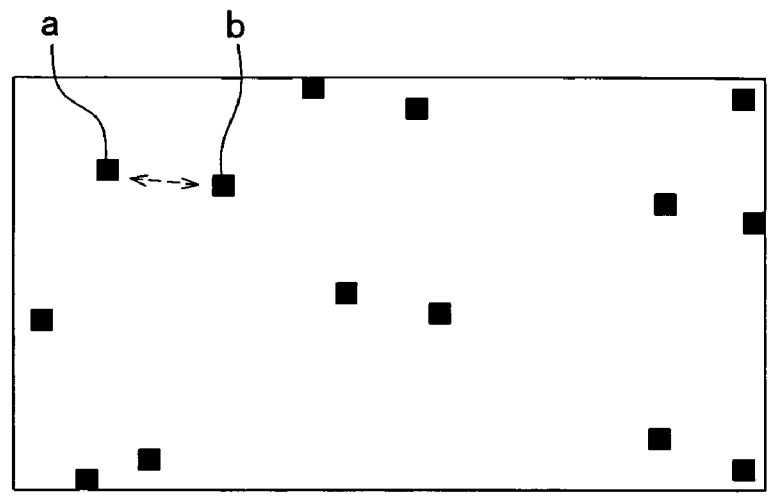
FIGS. 13A and 13B are conceptual illustrations of dots distributed sparsely in a highlight area.
Figure 13B:
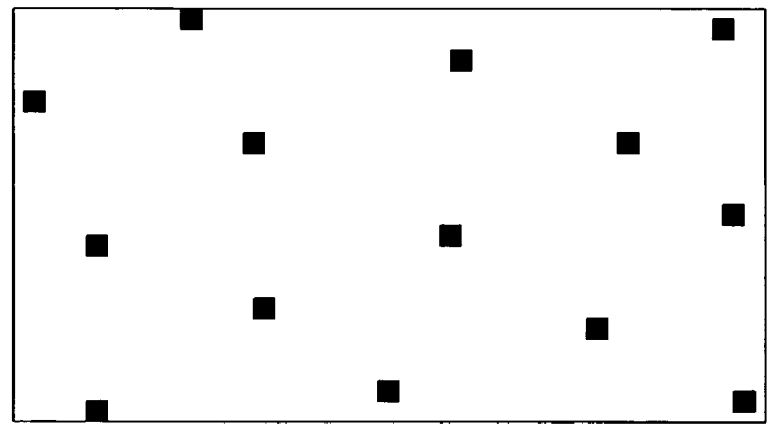

FIGS. 13A & 13B conceptually illustrate improved picture quality afforded by error diffusion using the method of the working example. FIGS. 13A & 13B depict dots formed sparsely in a highlight area. FIG. 13A depicts an instance in which, despite switching matrices, each of the matrices used diffuses error uniformly. FIG. 13B depicts an instance in which not only are matrices switched, but a high directivity matrix is used as the error diffusion having the widest diffusion range. The total number of dots produced is the same in either case. However, in FIG. 13A, areas in which two dots are produced in proximity to one another are apparent. For example, dot b is formed in proximity to dot a. Inherently, forming dot a in a highlight area will produce large error, so it is natural to expect that dots are not likely to be produced in the neighboring area into which the error has been diffused. However, if error is diffused over a wide area, the values of error diffused into individual pixels is small, so if error is diffused uniformly, it will not be possible to adequately inhibit formation of dots in pixels in the left to right direction. Reasons such as the above may explain the fact that dots a and b are formed in proximity to one another despite dots being formed sparsely in highlight areas.

In contrast, in the case depicted in FIG. 13B, error due to dot formation is diffused with bias in the raster direction, through the use of an error diffusion matrix having high directivity. Thus, formation of several dots in proximity to one another in the raster direction may be reliably avoided. Of course, where error is diffused with bias in the raster direction in this way, the proportion diffused in the direction orthogonal to the rasters declines, and thus formation of dots in proximity to one another in the raster-orthogonal direction is a concern. However, as mentioned previously, as long as there is switching among matrices, error is diffused indirectly in the raster-orthogonal direction as well. Thus, as illustrated in FIG. 13, in actual practice dots in the raster-orthogonal direction may be formed about the same distance apart as in the raster direction.

D. Variant Examples (1) Variant Example 1

Figure 14A:
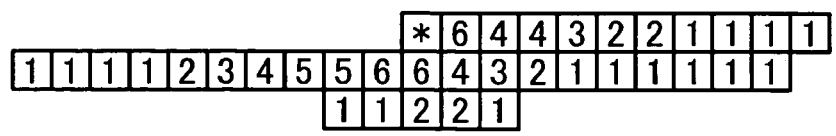
FIGS. 14A and 14B are illustrations of other error diffusion matrices.
Figure 14B:
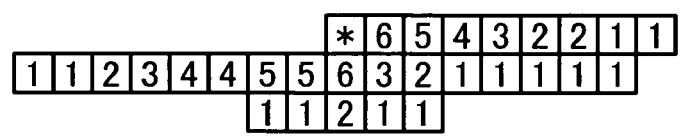

In the preceding description, the tone number conversion process is carried out using the set of error diffusion matrices depicted in FIGS. 7A to 7F, but some other appropriately selected combination of suitable error diffusion matrices could be used instead. The matrix having at least the widest diffusion range is not limited to the matrices shown by way of example in FIGS. 7A to 7F, but could be any matrix having a directivity factor of 2.0 or higher. For example, a suitable combination of the error diffusion matrices shown in FIGS. 14A and 14B could be used.

The error diffusion matrix having a directivity factor of 2.0 or higher are not necessarily limited to the single matrix having the widest diffusion range. Several error diffusion matrices having directivity factors of 2.0 or higher could be used.

Among the plurality of error diffusion matrices, matrices having wider diffusion ranges (i.e., diffusing error in to a greater number of pixels) may also be given large directivity factors. The error diffused into individual pixels is smaller the wider the diffusion range of a matrix. Accordingly, by employing matrices that have larger directivity factors in association with wider diffusion ranges, error can be diffused effectively. Since if pixels diffusing error are fairly few in number, error can be effectively diffused into all pixels, for a fairly small matrix, there is no mismatch between diffusion range size hierarchy and directivity factor hierarchy.

(2) Variant Example 2

The method of switching among high directivity error diffusion matrices in order to effectively diffuse tone error into a wide range is also applicable in instances where a plurality of pixels are grouped into superpixels, and processing carried out on superpixel units. A simple description of such a second variant example follows.

For convenience in description, let it be assumed that a total of four pixels, arrayed two each in vertical and horizontal directions, are grouped into a superpixel. FIGS. 15A to 15C illustrate error diffusion occurring with superpixels composed of four pixels each. In FIG. 15A, pixels are indicated by broken line squares, and superpixels by solid line squares. The hatched superpixel represents the superpixel currently being processed. Hereinafter, the superpixel currently being processed shall be distinguished by the designation "Superpixel *", and superpixels neighboring the superpixel currently being processed shall be distinguished by the designations "Superpixel A" to "Superpixel J". When processing is carried out in superpixel units, a number of different methods are conceivable for defining superpixel image data or tone error produced by a superpixel; here, as the simplest definition, the sum of values for the pixels included in a superpixel will be used. That is, the image data of a superpixel, for example, is defined as the sum of image data for all pixels in the superpixel, and the tone error produced by the superpixel is defined as the sum of tone error produced by all pixels in the superpixel.

As indicated by the arrows in FIG. 15A, tone error produced by Superpixel * is diffused into Superpixels A to J. During diffusion, an error diffusion matrix that processes in pixel units may be cannibalized, taking the weighting factors precalculated in the matrix for use as weighting factors when diffusing into superpixels. Error diffused into superpixels in this way is then further diffused into the individual pixels within each superpixel in accordance with a predetermined method.

When processing with superpixel units in this way, error is diffused as follows. Where a superpixel is situated in a highlight area, in the event that even a single dot will be formed in the superpixel, error diffusion is carried out using an error diffusion matrix with a wide diffusion range. Where a superpixel is situated in a shadow area, in the event that the superpixel contains even a single pixel on which no dot will be formed, error diffusion is carried out using an error diffusion matrix with a wide diffusion range. At this time, in a manner analogous to the working example described previously, error can be effectively diffused over a wide range through the use of an error diffusion matrix having high directivity.

As compared to the case where error is diffused in pixel units, when diffusing error in superpixel units, in actual practice error is diffused over a wider area, even where the same given error diffusion matrix is used. Taking this into consideration, the directivity factor of the matrix employed for diffusion into superpixels may be calculated as follows. For example, as shown in FIG. 15B, where the weighting factors assigned to superpixels neighboring the superpixel being processed are defined as a to j, a directivity factor may be calculated using the equation given in FIG. 15C. By so doing, it is possible to calculate a more appropriate directivity factor.

In the equation, the reason that weighting factor a for Superpixel A is multiplied by the constant 2 reflects the fact that it is composed of two pixels each in the vertical and horizontal directions. Accordingly, where a superpixel is composed of n pixels each in the vertical and horizontal directions, weighting factor a would be multiplied by a constant n. Similarly, for other weighting factors, the constant may be varied according to the number of pixels making up the superpixel.

While the invention has been shown and described hereinabove through certain working examples, various other embodiments are possible without departing from the scope and spirit thereof. For example, the software program (application program) for executing the functions described hereinabove may be run after being supplied to the main memory or an external memory device in the computer system via a communications network. Of course, the software program may also be run from a CD-ROM, flexible disk, or the like.

In the working examples described hereinabove, the image data conversion process is performed in the computer, but some or all of the image data conversion process could instead by performed by the printer, or by some dedicated image processing device.

Additionally, the image image/video display device is not necessarily limited to a printing device that prints an image by forming ink dots on a printing medium, but could instead be a liquid crystal display device that displays an image of continuously changing tone by dispersing luminescent spots at appropriate density on a liquid crystal display screen.

What is claimed is:

1. An image processing device for processing each pixel of an image to convert multitone image data into data of a format represented by the dot on-off state for each said pixel, along a raster consisting of a row of said pixels, said device comprising:

tone error calculating unit that, during said conversion for each said pixel, calculates tone error corresponding error in tone representation occurring in a pixel of interest having undergone said conversion;

matrix storage unit that stores a plurality of types of error diffusion matrices of different diffusion range size, said error diffusion matrices indicating weights for each pixel, for diffusing said tone error into unprocessed pixels neighboring said pixel of interest;

matrix selection unit that selects a single error diffusion matrix from among said stored plurality of types of error diffusion matrices, depending on the image data for said pixel of interest;

error diffusion unit that diffuses said tone error into peripheral pixels adjacent to said pixel of interest, in accordance with said selected matrix; and data conversion unit that converts said image data into data of a format represented by the dot on-off state for said pixel of interest, while considering said tone error diffused from processed peripheral pixels, and wherein said matrix storage unit has prestored therein at least one error diffusion matrix with a directivity factor, which indicates the extent of diffusion of said tone error in said raster direction, to be 2.0 or higher, as said error diffusion matrix having a widest diffusion range in said raster direction.

2. An image processing device according to claim 1, wherein said matrix selection unit selects an error diffusion matrix having a wider diffusion range the smaller the image data of said pixel of interest.

3. An image processing device according to claim 1, wherein said matrix selection unit selects said single error diffusion matrix in consideration of said conversion result for said pixel of interest, in addition to the image data for said pixel of interest.

4. An image processing device according to claim 1, wherein said matrix storage has stored therein error diffusion matrices of larger directivity factor the wider a diffusion range.

5. An image processing device according to claim 1, wherein said matrix storage unit has stored therein a matrix whose diffusion range is limited to within both of a raster including said pixel of interest and a raster adjacent to said raster, as regards said error diffusion matrix whose directivity factor is 2.0 or higher.

6. An image processing device according to claim 1, wherein said matrix selection unit selects an error diffusion matrix having the widest diffusion range in said raster direction, when said pixel of interest meets the following two conditions:

(a) the condition that the absolute value of the difference between the tone value represented by said dot on-off state on said pixel of interest and the tone value of the image data for said pixel of interest is equal or greater than a predetermined value; and (b) the condition that the tone value of the image data of said pixel of interest is in at least one area which is either a low tone area smaller than a predetermined first threshold value, or a high tone area greater than a predetermined second threshold value wherein the first threshold value is smaller the second threshold value.

7. An image processing device according to claim 6, wherein said matrix storage unit has stored therein, in addition to said error diffusion matrix whose directivity factor is 2.0 or higher, an error diffusion matrix whose directivity factor is 1.0 or lower, and
said matrix selection unit selects said error diffusion matrix with a directivity factor of 1.0 or lower in the event that said tone value difference is smaller than a predetermined value.

8. An image processing device according to claim 6, wherein said matrix selection unit selects said error diffusion matrix whose a directivity factor is 2.0 or higher, in the event that the tone value of said image data for said pixel of interest is smaller than said first threshold value, and a dot is formed on said pixel of interest.

9. An image processing device according to claim 6, wherein said matrix selection unit selects said error diffusion matrix whose directivity factor is 2.0 or higher, in the event that the tone value of said image data for said pixel of interest is greater than said second threshold value, and no dot is formed on said pixel of interest.

10. An image processing device according to claim 6, wherein said matrix selection unit selects the error diffusion matrix having a wider diffusion range the larger said tone difference, in addition to said two conditions.

11. An image processing device according to claim 10, wherein said matrix storage unit has stored therein a plurality of error diffusion matrices of higher directivity factors the wider a diffusion range in said raster direction, as said plurality of types of error diffusion matrices.

12. An image processing device according to claim 6, wherein
said matrix storage unit has stored therein at least one error diffusion matrix whose diffusion range is limited to within both a raster including said pixel of interest and a raster adjacent to said raster, as regards said error diffusion matrix whose directivity factor is 2.0 or higher.

13. An image processing device according to claim 12, wherein said error diffusion matrix whose directivity factor is 2.0 or higher has a limited diffusion range to within either the raster including said pixel of interest or the raster adjacent to said raster, in the extent beyond a predetermined distance in the raster forward direction which is the direction in which image data is converted along a raster from said pixel of interest.

14. An image processing device according to claim 13, wherein said error diffusion matrix whose directivity factor is 2.0 or higher has a limited diffusion range to within the raster adjacent the raster including said pixel of interest, in the opposite direction from said raster forward direction.

15. An image processing device according to claim 1, further comprising:
superpixel generating unit that groups predetermined numbers of adjacent pixels into groups as superpixels,
wherein said tone error calculating unit, said matrix storage unit, said matrix selection unit, said error diffusion unit, and said data conversion unit perform each process on said superpixels.

16. Image processing method for processing each pixel of an image to convert multitone image data into data of a format represented by the dot on-off state for each said pixel, along a raster consisting of a row of said pixels, the method comprising the following steps:
first step for providing a plurality of types of error diffusion matrices which respectively define different diffusion condition including a directivity factor which indicates the extent of diffusion in said raster direction of tone error to be occurring in said conversion at a pixel of interest, wherein said error diffusion matrices indicate weights for each said peripheral pixel and said directivity factor of an error diffusion matrix which has the widest diffusion range in said raster direction is 2.0 or higher;
second step for calculating said tone error of said pixel of interest, each time that said image data is converted to data of a format represented by the dot on-off state for each said pixel;
third step for selecting one error diffusion matrix among said stored plurality of types of error diffusion matrices, based on the image data for said pixel of interest;
fourth step for diffusing said tone error into unprocessed peripheral pixels adjacent to said pixel of interest based on said weights of said selected matrix; and
fifth step for converting said image data into data of the format represented by the dot on-off state for said pixel of interest in consideration of said tone error diffused from processed peripheral pixels.

17. Image processing method according to claim 16, wherein said third step selects an error diffusion matrix having the widest diffusion range in said raster direction, when said pixel of interest meets the following two conditions:
(a) the condition that the absolute value of the difference between the tone value represented by said dot on-off state on said pixel of interest and the tone value of the image data for said pixel of interest is equal or greater than a predetermined value; and
(b) the condition that the tone value of the image data of said pixel of interest is in at least one area which is either a low tone area smaller than a predetermined first threshold value, or a high tone area greater than a predetermined second threshold value wherein the first threshold value is smaller the second threshold value.

18. A program product for processing each pixel of an image to convert multitone image data into data of a format represented by the dot on-off state for each said pixel, along a raster consisting of a row of said pixels, said program product comprising: a computer readable medium; and computer program code means stored on said computer readable medium, said computer program code means comprising:
first program code means for providing a plurality of types of error diffusion matrices which respectively define different diffusion condition including a directivity factor which indicates the extent of diffusion in said raster direction of tone error to be occurring in said conversion at a pixel of interest, wherein said error diffusion matrices indicate weights for each said peripheral pixel and said directivity factor of an error diffusion matrix which has the widest diffusion range in said raster direction is 2.0 or higher;
second program code means for calculating said tone error of said pixel of interest, each time that said image data is converted to data of a format represented by the dot on-off state for each said pixel;
third program code means for selecting one error diffusion matrix among said stored plurality of types of error diffusion matrices, based on the image data for said pixel of interest;
fourth program code means for diffusing said tone error into unprocessed peripheral pixels adjacent to said pixel of interest based on said weights of said selected matrix; and
fifth program code means for converting said image data into data of the format represented by the dot on-off state for said pixel of interest in consideration of said tone error diffused from processed peripheral pixels.

19. A program product according to claim 18, wherein said third program code means selects an error diffusion matrix having the widest diffusion range in said raster direction, when said pixel of interest meets the following two conditions:
   (a) the condition that the absolute value of the difference between the tone value represented by said dot on-off state on said pixel of interest and the tone value of the image data for said pixel of interest is equal or greater than a predetermined value; and
   (b) the condition that the tone value of the image data of said pixel of interest is in at least one area which is either a low tone area smaller than a predetermined first threshold value, or a high tone area greater than a predetermined second threshold value wherein the first threshold value is smaller the second threshold value.

* * * * *